3,395,130
CATIONIC THERMOSETTING SYNTHETIC
RESINS
Robert McDowell Barrett, Stourbridge, and Eric Roy
Miller, Walsall, England, assignors to British Industrial Plastics Limited, London, England, a corporation
of the United Kingdom
No Drawing. Filed Aug. 28, 1964, Ser. No. 392,944
Claims priority, application Great Britain, Sept. 3, 1963,
34,747
8 Claims. (Cl. 260—78)

ABSTRACT OF THE DISCLOSURE

Cationic thermosetting resins are prepared by reacting (1) a heterocyclic dibasic carboxylic acid of the formula

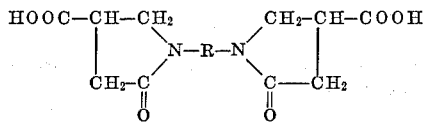

where R is phenylene or ethylene with (2) a polyalkylene polyamine and then reacting the resulting water soluble polyamide with epichlorhydrin.

---

The invention relates to the manufacture of novel condensation products, particularly to the manufacture of cationic thermosetting resins, to the products so produced and to the applications of those products.

It is known to produce thermosetting resins by reacting a polyamide derived from a polyalkylene polyamine and a saturated aliphatic dibasic carboxylic acid with epichlorohydrin. It is also known to produce epoxidised polyamide resins by reacting a polycarboxylic unsaturated aliphatic acid and/or a polycarboxylic aromatic acid with an alkylene polyamine having at least two primary amino groups and at least one secondary amino group to form a polyamide, and then reacting the polyamide with a water-soluble or water-dispersible halohydrin containing an epoxy group.

We have found that especially useful resins may be produced by the use of a particular series of heterocyclic dicarboxylic acids, and according to the present invention a process for producing a cationic thermosetting resin comprises reacting a heterocyclic dibasic carboxylic acid, produced by reacting itaconic acid with an alkylene or arylene diamine, with a polyalkylene polyamine to produce a water-soluble polyamide, and reacting the polyamide with epichlorohydrin. The products may be used to impart wet-strength to paper and to improve the bonding of coatings, particularly moisture-proof coatings, to regenerated cellulose film.

A particularly suitable heterocyclic dibasic carboxylic acid is that produced by reacting itaconic acid with ethylene diamine, having the formula:

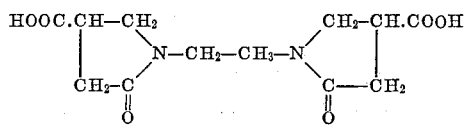

Another heterocyclic acid which may be used is that produced by the reaction of itaconic acid with phenylene diamine.

A variety of polyalkylene polyamines may be used in the process of the invention, but the preferred compounds are polyethylene polyamines, for example diethylene triamine, triethylene tetramine, tetraethylene pentamine, pentaethylene hexamine, and mixtures of polyethylene polyamines. It is desirable in some cases to increase the spacing of the secondary amino groups in the polyamide, in order to change the reactivity of the polyamide-epichlorohydrin complex. This may be accomplished by substituting a diamine, such as ethylene diamine, for part of the polyalkylene polyamines.

The temperatures employed for carrying out the reaction between the dibasic acid and the polyalkylene polyamine may vary from 110° C. to 250° C. at atmospheric pressure, and are preferably in the range 150° C. to 220° C. When reduced pressures are used, rather lower temperatures are utilised. The time of reaction depends on the temperature and pressure used and normally varies from about 2 to 6 hours. The reaction is preferably continued to substantial completion for best results.

When carrying out the reaction, the amount of itaconic acid and alkylene or arylene diamine used is preferably such that the resulting dibasic acid reacts substantially completely with the primary amino groups of the polyalkylene polyamine, but does not react with the secondary amino groups to any substantial extent.

The reaction between the polyamide, formed as described above, and epichlorohydrin to form a cationic thermosetting resin may be carried out at a temperature from 45° C. to 100° C., preferably within the range 50 to 80° C., and is continued until the reaction mix reaches the desired viscosity. Preferably the amount of epichlorohydrin is sufficient to convert all of the secondary amino groups to tertiary amino groups. However, more or less may be added to moderate or increase the rate of reaction.

When the desired viscosity is reached, sufficient water is added to adjust the solids content of the resin solution to a value such that the resin is stable and the water content is as low as possible, to cut down storage and transport costs. Such a value is generally between 20 and 30% by weight. The resin is then stabilized by the addition of acid to reduce the pH to at least about 4. Any suitable acid may be used, but normally hydrochloric acid is preferred.

If desired, the stability of the cationic resins of the invention may be improved by incorporating into the resin formulation appropriate amounts of an agent capable of quaternising tertiary nitrogen atoms formed by reaction of the epichlorohydrin with secondary amino groups of the polyamide. Such quaternizing agents include the lower alkyl salts of mineral acids, such as alkyl halides, sulphates and phosphates, and substituted alkyl halides, and are found to be most desirable when it is required to render the resins stable for a period in excess of a few weeks.

The cationic thermosetting resins of the present invention are useful in a number of applications. They are particularly useful in the wet-strengthening of paper, wherein they are added at the wet end of the paper-making machine, and it has been found that a high degree of wet-strength is imparted to paper and paper products when these resins are incorporated therein or applied thereto. The uncured cationic thermosetting resins, when incorporated in paper in any suitable manner, may be cured under acid, neutral or alkaline conditions at elevated temperatures. It is particularly advantageous to cure them under neutral or alkaline conditions, since in the first place corrosion of the equipment is avoided, and the paper itself has better keeping properties and may, if desired, be made more absorbent under non-acid conditions. The resins are also useful for wet-end addition in the treatment of non-fibrous regenerated cellulose film, to improve the bonding of coatings, particularly moistureproof coatings, to such film.

The invention will be illustrated by means of the following experimental examples.

Example 1

585 g. itaconic acid and 350 g. water were charged into a 2-litre flask equipped with a condenser, thermometer and stirrer. 145 g. 98% ethylene diamine were added to the mixture, and after the initial exothermic reaction the solution was heated to boiling and concentrated to complete the formation of the heterocyclic acid:

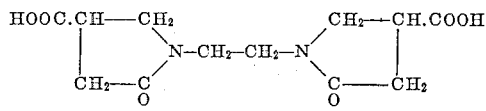

This acid is a crystalline solid with a melting point of 237–240° C. An elemental analysis of the acid as prepared gave 50.6% C, 5.8% H and 10.1% N (cf. theoretical 50.7% C, 5.7% H and 9.9% N).

After evaporating off about 230 gms. water, the solution was cooled to 90° C. and 252 g. diethylene triamine were added, the mixture being cooled in order to keep the temperature below 105° C. throughout the addition. When the diethylene triamine addition was complete, the solution was heated to 190° C. over a period of 3 hours and maintained at this temperature for an hour. The polyamide resin was then blended with 820 g. water, the solids content checked, and a further 1616 g. water added to bring the solids content to 25% by weight.

208 g. epichlorohydrin were added to the solution at 50° C., and the resin maintained at 70° C. for 1½ hours until the viscosity had increased to 2 poises. It was then cooled and blended with 540 g. water and 80 mls. 10% by weight hydrochloric acid.

The final product was a low viscosity, straw-coloured liquid with a solids content of 25% by weight.

Example 2

The same heterocyclic dicarboxylic acid as described in Example 1 was prepared using 520 g. itaconic acid, 300 g. water, and 128 g. 98% ethylene diamine. To the acid solution, concentrated by evaporating off about 200 gms. water, were added 506 g. pentaethylene hexamine, the mixture being cooled to keep the temperature below 105° C. When the addition was complete, the resin was heated to 190° C. and maintained at this temperature for an hour, after which it was blended with one litre of water, the solids content checked and a further two litres of water added to bring the solids content to 25% by weight.

The polyamide so prepared was reacted with 725 g. epichlorohydrin at 50° C. After heating at 70° C. for 1½ hours the resin was cooled to 40° C. and blended with two litres of water and 200 mls. of 10% by weight hydrochloric acid. A low viscosity, straw-coloured liquid was obtained with a solids content of 25% by weight.

Example 3

A polyamide was prepared as in Example 1 and its solution, after blending, had a solids content of 54.4% by weight.

200 g. of the polyamide solution were dissolved in 235 g. water, and the solution was heated with stirring to 50° C. 27 g. epichlorohydrin were added and the solution was heated at 70° C. for 45 minutes until the viscosity had reached 1.7 poises. 18 g. dimethyl sulphate were immediately added, followed by 120 g. water and 10 mls. 10% by weight hydrochloric acid.

The resins produced by the methods described in Examples 1, 2 and 3 were tested for wet-strengthening properties. Hand-sheets were made on the Papermakers Association Standard Apparatus for pulp evaluation using Soundview pulp, beaten to a Canadian Freeness of 430. 2.5 parts by weight of resin solids per 100 parts by weight of dry pulp were used and the pH of the pulp was adjusted to 7.5 with sodium carbonate, as was the pH of the backwater. After drying, the sheets were heated at 127° C. for 10 minutes to cure the resins. The results shown by the respective resins are compared in the following table, which also illustrates the results shown by a blank run, i.e. with no resin present.

| Example | Breaking Lengths, Kms. | | Percent Wet/Dry |
|---|---|---|---|
| | Dry | Wet | |
| 1 | 6.07 | 2.39 | 39.3 |
| 2 | 6.22 | 1.93 | 31.1 |
| 3 | 6.58 | 2.42 | 36.8 |
| Blank (no resin) | 4.00 | 0.08 | 2.0 |

Example 4

The same heterocyclic dicarboxylic acid was prepared as in Example 2. The acid solution, after concentration as in Example 2, was cooled to 90° C. and 318 g. triethylene tetramine were added, the mixture being cooled to keep the temperature below 105° C. throughout the addition. When the addition was complete, the solution was heated to 190° C. over a period of 3 hours and maintained at this temperature for an hour. The resin was then blended with water and had a solids content of 56.5% by weight.

200 g. of this polyamide resin were dissolved in 252 g. water and the solution was heated to 50° C. with stirring. 56.8 g. epichlorohydrin were added and the solution was heated at 70° C. until the viscosity had reached 1.7 poises. Hydrochloric acid was added to adjust the pH to 4.0 and the resin was cooled to 25° C. Water was added to give a solids content of 25% by weight.

When tested on paper the product was found to be an efficient wet-strengthening resin with properties equivalent to those described in Examples 1 to 3.

What is claimed is:

1. A cationic thermosetting resin prepared by reacting a heterocyclic dibasic carboxylic acid having the formula

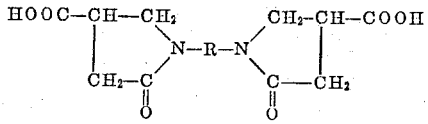

with a polyalkylene polyamine having two primary amino group and at least one secondary amino group between said alkylene groups to produce a water-soluble polyamide, and reacting the polyamide with epichlorohydrin, R being selected from the group consisting of ethylene and phenylene.

2. A product according to claim 1 wherein R is —$CH_2CH_2$—.

3. A product according to claim 2 wherein the polyalkylene polyamine is selected from the group consisting of diethylene triamine, triethylene tetramine, tetraethylene pentamine and pentaethylene hexamine.

4. A product according to claim 3 wherein the heterocyclic dibasic acid is employed in an amount sufficient to react substantially completely with the primary amino groups of the polyalkylene polyamine but in an amount insufficient to react substantially with the secondary amino group of said polyamine.

5. A product according to claim 4 wherein sufficient epichlorhydrin is used to convert all of the secondary amino groups to tertiary amino groups.

6. A product according to claim 1 wherein R is phenylene.

7. A product according to claim 6 wherein the polyalkylene polyamine is selected from the group consisting of diethylene triamine, triethylene tetramine, tetraethylene pentamine and pentamethylene hexamine.

8. A quaternary ammonium product prepared by reacting the product of claim 1 with a quaternizing agent.

References Cited
UNITED STATES PATENTS

| | | | |
|---|---|---|---|
| 2,993,021 | 7/1961 | Bauley et al. | 260—78 |
| 3,004,987 | 10/1961 | Paris et al. | 260—78 |
| 3,125,552 | 3/1964 | Loshaek et al. | 260—78 |
| 3,240,761 | 3/1966 | Keim et al. | 260—78 |

WILLIAM H. SHORT, *Primary Examiner.*

M. GOLDSTEIN, *Assistant Examiner.*